United States Patent [19]

Capelle et al.

[11] 4,046,747
[45] Sept. 6, 1977

[54] ADDITIVE FOR IMPROVING THE ADHESION TO TEXTILES OF HOT MELT ADHESIVES BASED ON COPOLYAMIDES

[75] Inventors: Anton Capelle, Delden, Netherlands; Heinz Scholten, Lippramsdorf, Germany

[73] Assignee: Chemische Werke Huls Aktiengesellschaft, Marl, Germany

[21] Appl. No.: 617,440

[22] Filed: Sept. 29, 1975

[30] Foreign Application Priority Data

Oct. 10, 1974 Germany .............................. 2448344

[51] Int. Cl.$^2$ .............................................. C08L 77/02
[52] U.S. Cl. .................................. 260/78 S; 156/331; 260/51.5; 260/78 A; 260/78 L; 260/841; 428/474; 526/6
[58] Field of Search ................. 260/78 S, 78 L, 78 A, 260/51.5, 841

[56] References Cited

U.S. PATENT DOCUMENTS 3,859,378  1/1975  Hochreuter ..................... 260/78 S Primary Examiner—Harold D. Anderson
Attorney, Agent, or Firm—Gilbert L. Wells

[57] ABSTRACT

Additives for textile hot melt adhesives based on copolyamides comprising, based on the total weight of copolyamide:

a. 0.05 – 2 percent by weight of at least one acid amide of the general formula

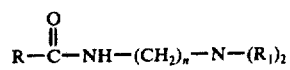

wherein R represents a saturated or unsaturated aliphatic hydrocarbon group of 12–20 carbon atoms, $R_1$ represents an alkyl group of 1 to 3 carbon atoms, and $n$ represents an integer of between 3 and 6; and b. 0.05 – 2 percent by weight of a mixture of differently condensed aminoalkyl phenols of the general formula

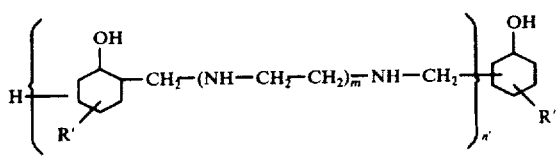

wherein $n'$ can assume the value of 0.5 – 2, $m$ can assume the value of 2 – 6, and R' represent an aliphatic hydrocarbon group of 8–10 carbon atoms which is in the ortho- or para-position with respect to the OH-group.

4 Claims, No Drawings

ADDITIVE FOR IMPROVING THE ADHESION TO TEXTILES OF HOT MELT ADHESIVES BASED ON COPOLYAMIDES

CROSS REFERENCE TO A RELATED APPLICATION

Applicants claim priority under 35 U.S.C. 119 for Application P 24 48 344.1, filed Oct. 10, 1974, in the Patent Office of the Federal Republic of Germany.

BACKGROUND OF THE INVENTION

The present invention relates to additives to hot melt adhesives based upon copolyamides which improve the adhesive strength and wash-fastness of the latter.

Hot melt adhesives are used for the coating of textile insert materials for face setting, especially in the so-called spot-wise coating method. Thermoplastic synthetic resins are used as the hot melt adhesives. Thus, it is known to use high pressure polyethylene for textiles which are exposed to only minor stresses. More advantageous bonds are obtained with the use of so-called low pressure polyethylene. The last-mentioned compounds have a very good wash-fastness, but show no or only very little resistance against cleaning agents employed in dry cleaning. Copolymers, especially tertiary and also higher copolyamides, have also been employed for a long time. Hot melt adhesives based upon copolyamides are basically of satisfactory resistance to dry cleaning agents. The wash-fastness, which can be denoted as good to satisfactory, depending on the composition, needs to be improved, however. In general, copolyamide hot melt adhesives of a higher melting point are more wash-fast and this brings the disadvantage of higher processing temperatures and/or the necessity of employing higher pressures and thus longer cycle times during processing.

The state of the art of polyamides may be ascertained by reference to Kirk-Othmer "Encyclopedia of Chemical Technology," Vol. 16 (1968), pp 1 - 105, particularly pp. 22 and 23 which disclose copolymerization, pp. 92–95 which disclose additives, and p. 101 which discloses soluble polyamides made by copolymerization, the disclosures of which are incorporated herein. The preparation of copolyamides useful in the present invention may be ascertained by reference to U.S. Pat. No. 3,410,832; British Pat. No. 1,168,404; German Published Pat. application No. 2,030,741, and Japanese Pat. No. 68-22,875.

The acid amides of the general formula useful in the present invention are available as commercial compositions; their preparationn is known in the art and may be effected as disclosed further in the specification.

The aminoalkyl phenols of the general formula useful in the present application are also available as commercial compositions, and their preparation is known in the art and may be effected as disclosed further in the specification.

Hot melt adhesives which are used in the form of powders or so-called pastes are known as disclosed in US-Pat. Nos. 3,515,702; 3,839,121 and are prepared as disclosed in German Published Pat. applications Nos. 2,007,971; 2,229,308; and 2,307,346. Also, a great variety of additives are known, which serve in part for reducing the melting points of the copolyamides, for example plasticizers and/or additives of homopolyamides as disclosed in French Pat. No. 1,367,481; U.S. Pat. No. 3,306,865; and German Published Pat. applications Nos. 1,794,247; 1,930,129; 2,237,674; and 1,794,106. The conventional additives, however, are not as yet fully satisfactory.

SUMMARY OF THE INVENTION

Having in mind the limitations of the prior art, it is an object of the present invention to improve the wash-fastness of hot melt adhesives based on copolyamides, especially those based upon low melting copolyamides which are peferred from the viewpoint of processing technology.

This object is achieved in the present invention by the use, as the additives, of the following, based on the amount of copolyamides contained in the hot melt adhesive;

a. about 0.05 – 2 percent by weight of at least one acid amide of the general formula

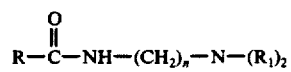

wherein

R represents a saturated or unsaturated aliphatic hydrocarbon group having 12–20 carbon atoms, $R_1$ represents an alkyl group of 1 to 3 carbon atoms, and n represents an integer of between 3 and 6; and b. about 0.05 – 2 percent by weight of a mixture of differently condensed aminoalkyl phenols of the general formula

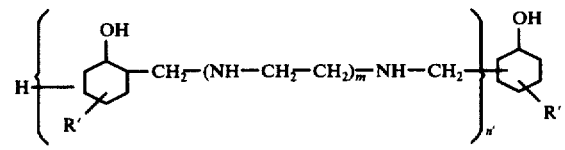

wherein n' assumes the value of 0.5 – 2, m assumes the value of 2 – 6, and

R' represents an aliphatic hydrocarbon group having 8–10 carbon atoms which is in the ortho- or para-position with respect to the OH-group.

Preferably, the component (a) is employed in amounts of about 0.5 – 1.5 percent by weight, and the component (b) is employed in amounts of about 0.5 – 1.5 percent by weight. Preferably, the components (a) and (b) are used in the weight ratio of 1 : 1; however, it is also possible to use mixture ratios of between 1 : 3 and 3 : 1 .

DESCRIPTION OF THE PREFERRED EMBODIMENTS

The component (a) mixture is conventionally obtained by the condensation of long chain, saturated or unsaturated fatty acids, such as lauric acid, palmitic acid, stearic acid, oleic acid, especially by using the mixture of the fatty acids, present in vegetable oils, such as tall oil, linseed oil, with preferably an N,N-dimethyldiamine, such as N,N-dimethyl-1,3-diaminopropane, N,N-dimethyl-1,4-diaminobutane, N,N-dimethyl-1,6-diaminohexane; and especially N,N-dimethyl-1,3-diaminopropane is employed. Also may be employed a corresponding N,N-diethyldiamine, and N,N-dipropyldiamine, an N,N-diisopropyldiamine.

Component (b) is obtained by reacting a commercially available alkyl phenol, especially nonylphenol, with formaldehyde and a polyamine of the formula

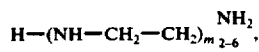

preferably polyethyleneamine. During this reaction, a mixture of varying degrees of condensation is obtained. The average degree of condensation n' ranges between 0.5 and 2. The additives are added to the copolyamides, which latter are present in granulated form, either prior to the grinding step or they are added to the finished powders, for example in a spray mixer. However, it is also possible to incorporate these additives during the production of so-called pastes.

The copolyamides employed, which represent particularly the at least ternary copolyamides, contain customarily 10 – 90 molar percent of aliphatic and optionally cyclic dicarboxylic acid groups having 4–12 carbon atoms and groups equivalent thereto of aliphatic and/or cyclic diamines having 4 – 15 carbon atoms, wherein the diamine groups are branched; and 90 – 10 molar percent of one or more aminocarboxylic acid groups having 4 – 14 carbon atoms. In particular, the copolyamides are used which contain as the building block lauryllactam and/or decanedicarboxylic acid, wherein the diamine groups are partially branched or wherein optionally also terephthalic acid and/or isophthalic acid is present in subordinate amounts compared to the dicarboxylic acids.

Examples in this connection of the copolyamides 12/6, 6/6, 12/12, 6/6, 6/6, 6/12, 6 useful in the present invention wherein in the hexamethylenediamine-adipic acid salt or decanedicarboxylic acid salt employed, the amine component is partially substituted by, for example, trimethylhexamethylenediamine and/or 1-amino-3-aminomethyl-3,5,5-trimethyl-cyclohexane (isophorone diamine), and the acid component is partially replaced by terephthalic acid and/or is phthalic acid.

Examples of the overall combination of hot melt adhesives containing : A-Polyamide and B-Additives of Components (a) an (b) include: A-99 percent by weight terpolyamide of nylon 6/6, 6/12 and B (a) 0.5 percent by weight of N,N-dimethylpropylamide of tall oil fatty acid; B (b) 0.5 percent by weight of the condensation product of 2 moles of nonylphenol, 2 moles of formaldehyde and 1 mole of tetraethylenepentamine; A-99 percent by weight terpolyamide of nylon 6/12, 6/12 and B (a) 0.5 percent by weight of N,N-dimethylpropylamide of tall oil fatty acid, B (b) 0.5 percent by weight of the condensation product of 2 moles of nonylphenol, 2 moles of formaldehyde and 1 mole of tetraethylenepentamine. A-99 percent by weight terpolyamide prepared from 55-60 percent by weight laurolactam, 15-20 percent by weight caprolactam, 10-15 percent by weight adipic acid, 0-7 percent by weight isophoronediamine, 0-6 percent by weight trimethylhexamethylenediamine and 0-13 percent by weight hexamethylenediamine; B (a) 0.5 percent by weight of N,N-dimethylpropylamide of tall oil fatty acid; B (b) 0.5 percent by weight of the condensation product of 2 moles of nonylphenol, 2 moles of formadehyde and 1 mole of tetraethylenepentamine, B (a) may be N,N-dimethylpropylamide of stearic acid. The copolyamides of the present invention include a terpolyamide of lauryl lactam, hexamethylene adipamide and caprolactam; a terpolyamide of lauryl lactam, dodecamethylene adipamide and caprolactam; a terpolyamide of caprolactam, hexamethylene adipamide and dodecamethylene adipamide; a terpolyamide of caprolactam, hexamethylene dodecamide and lauryl lactam; and terpolyamide of lauryl lactam, caprolactam, and X-adipic acid wherein X is isophoronediamine, trimethylenediamine or mixtures thereof. The copolyamides also include lactam, a terpolyamide of lauryllactam hexamethylene adipamide, and caprolactam; a terpolyamide of lauryl lactam, dodecamethylene adipamide and caprolactam; a terpolyamide of caprolactam, hexamethylene adipamide and dodecamethylene adipamide; a terpolyamide of caprolactam, hexamethylene dodecamide and lauryl lactam; and a terpolyamide of lauryl lactam, caprolactam, and X-adipic acid wherein X is isophoronediamine, trimethylhexamethylenediamine and mixtures thereof.

The invention may best be explained by reference to the following specific examples.

EXAMPLE 1

Equal parts by weight of the N,N-dimethylpropylamide of tall oil fatty acid (component a) and of the condensation product of 2 moles of nonylphenol, 2 moles of formaldehyde, and 1 mole of tetraethylenepentamine (component b) were emulsified in a small amount of water and applied in a spray mixer to a commercial copolyamide powder nylon 6/6, 6/12 or nylon 6/12, 6/12 having a particle size of 60 – 200 μ. The amount of the adhesion improving additive thus applied is seen from Table 1. The powders prepared in this way were applied according to the powder spotting method by means of a machine "System Saladin" to a lining fabric made of a polyester-cotton blended fabric, so that a coat of 17 g/m² was produced. Strips having respectively a width of 5 cm were bonded together with a cover material, wherein the setting time was 17 seconds, the pressure was 100 p/cm² (p = pond, 1/1000 kilopond), and the temperature was set to be 150° C. In the nip of the press, the maximum temperature of 136°–138° C, was produced. The separation strength was measured in a tearing machine. Part of the test strips was subjected three times to a 60° C fine washing step and, subsequently to drying, the separating strength was masured once again. Analogously thereto, the dry cleaning resistance of the bond was tested. The results are represented in Table 1. The separating strength values are average values from 5 measurements.

TABLE 1

| Amount of Additive Based on the Copolyamide % | Separating Strength p./5cm | Separating Strength After 3 Washings p./5cm | Separating Strength after 3 Dry Cleanings p./5cm |
| --- | --- | --- | --- |
| 0 | 400 | 200 | 400 |
| 0.1 | 450 | 300 | 450 |
| 0.2 | 550 | 600 | 600 |
| 0.3 | 750 | 700 | 900 |
| 0.4 | 1000 | 900 | 1000 |
| 1 | 1000 | 1000 | 1000 |

EXAMPLE 2

Respectively 0.5 part by weight of the N,N-dimethylpropylamide of stearic acid (component a) and of the condensation product from 2 moles of nonylphenol, 2 moles of formaldehyde, and 1 mole of tetraethylenepentamine (component b) were used in 250 parts by weight of a commercial polyamide paste containing 40 percent by weight of a copolyamide of nylon 6/12, 6/12 or nylon 6/6, 6/12 40 percent by weight of water, and 20 percent by weight of a 30 percent aqueous, commercial thickener based upon polyacrylic acid. The paste was transferred by way of a screen printing machine to a lining material. The dry coating weight was 21 g/m². After setting with a cover material at 170° C, 18 seconds of pressing time, and 500 p/cm² pressure, tear strength values of 2000 p/5 cm were found to exist which, after fine washing steps at 60° C, were reduced to, on the average, 1500 p/5 cm. In a comparative test without additives, separating strengths were found of 1800 p/5 cm which were reduced by 6 fine washing steps to 900 p/5 cm.

We claim:

1. A polyamide adhesive composition consisting essentially of:
    A. about 96 to 99.9 by weight of a solid copolyamide of an aliphatic dicarboxylic acid, cyclic dicarboxylic acid each having 4–12 carbon atoms or mixtures thereof or said dicarboxylic acids and an equivalent amount of aliphatic diamine, cyclic diamine each having 4 – 15 carbon atoms or mixtures thereof or aminocarboxylic acid having 4–16 carbon atoms or mixtures thereof; and
    B. an additive of
        a. about 0.05 – 2 percent by weight based on the total weight of copolyamide of at least one acid amide of the general formula

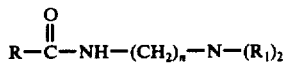

wherein R represents a saturated or unsaturated aliphatic hydrocarbon group having 12 - 20 carbon atoms, $R_1$ represents an alkyl group of 1 - 3 carbon atoms, and n represents an integer of between 3 and 6; and
        (b) about 0.05 – 2 percent by weight of a mixture of differently condensed aminoalkyl phenols of the general formula

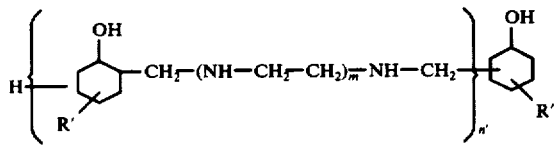

wherein n' has the value of 0.5 – 2,
    m has the value of 2 – 6, and
    R' represents an aliphatic hydrocarbon group having 8-10 carbon atoms which is in the ortho- or para-position with respect to the OH-group.

2. A polyamide adhesive composition consisting essentially of:
    A. about 96 to 99.9 percent by weight of a solid copolyamide of an aliphatic dicarboxylic acid, cyclic dicarboxylic acid each having 4 - 12 carbon atoms or mixtures thereof or said dicarboxyl acids and an equivalent amount of aliphatic diamine, cyclic diamine each having 4 - 15 carbon atoms or mixtures thereof or aminocarboxylic acid having 4 - 16 carbon atoms or mixtures thereof; and
    B. an additive of
        a. about 0.05 - 2 percent by weight based on the total weight of copolyamide of at least one acid amide of the general formula

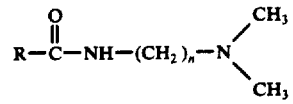

wherein R represents a saturated or unsaturated aliphatic hydrocarbon group having 12 - 20 carbon atoms and n represents an integer of between 3 and 6; and
        b. about 0.05 – 2 percent by weight of a mixture of differently condensed aminoalkyl phenols of the general formula

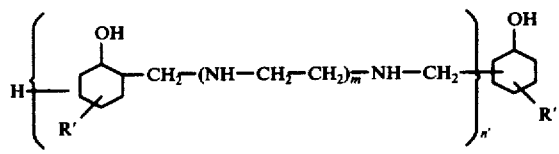

wherein
    n' has the value of 0.5 – 2,
    m has the value of 2 – 6, and
    R' represents an aliphatic hydrocarbon group having 8 – 10 carbon atoms which is in the ortho- or para- position with respect to the OH group.

3. The polyamide adhesive composition of claim 1 wherein said copolyamide of A is selected from the group consisting of a terpolyamide of lauryl lactam, hexamethylene adipamide and caprolactam; a terpolyamide of lauryl lactam, dodecamethylene adipamide and caprolactam; a terpolyamide of caprolactam, hexamethylene adipamide and dodecamethylene adipamide; a terpolyamide of caprolactam, hexamethylene dodecamide and lauryl lactam; and terpolyamide of lauryl lactam, caprolactam, and X-adipic acid wherein X is selected from the group consisting of isophoronediamine, trimethylhexamethylenediamine and mixtures thereof.

4. The polyamide adhesive composition of claim 2 wherein said copolyamide of A is selected from the group consisting of a terpolyamide of lauryl lactam, hexamethylene adipamide, and caprolactam; a terpolyamide of lauryl lactam, dodecamethylene adipamide and caprolactam; a terpolyamide of caprolactam, hexamethylene adipamide and dodecamethylene adipamide; a terpolyamide of caprolactam, hexamethylene dodecamide and lauryl lactam; and a terpolyamide of lauryl lactam, caprolactam, and X-adipic acid wherein X is selected from the group consisting of isophoronediamine, trimethylhexamethylenediamine and mixtures thereof.

* * * * *